United States Patent [19]
Lewis et al.

[11] Patent Number: 4,727,680
[45] Date of Patent: Mar. 1, 1988

[54] DOOR ASSEMBLY FOR CABINETS OR THE LIKE

[75] Inventors: Jeffrey M. Lewis, Maynard; John C. Killian, Jr., Sudbury, both of Mass.

[73] Assignee: Digital Equipment Corporation, Maynard, Mass.

[21] Appl. No.: 862,112

[22] Filed: May 12, 1986

[51] Int. Cl.⁴ .............................................. E05D 15/58
[52] U.S. Cl. ...................................... 49/260; 49/386
[58] Field of Search .............. 312/138, 139, 319, 222, 312/223; 49/260, 386

[56] References Cited
U.S. PATENT DOCUMENTS
2,202,277  5/1940  Visser ................... 49/260 X FOREIGN PATENT DOCUMENTS
69602  10/1945  Norway ................... 312/138

Primary Examiner—Joseph Falk
Attorney, Agent, or Firm—Cesari & McKenna

[57] ABSTRACT

A low clearance door assembly is provided which is suitable for a variety of applications. The assembly includes an easily operated door which has two guide pins extending from each end. Guide members provide slots in which the pins ride. A spring, connected between one of the pins and the adjacent guide member, assists the user in opening and closing the door. In addition, a detent disposed in one of the slots prevents the door from opening as a result of bumping.

5 Claims, 6 Drawing Figures

DOOR ASSEMBLY FOR CABINETS OR THE LIKE

BACKGROUND OF THE INVENTION

1. Field of the Invention

This invention relates to a door assembly for a so-called "floppy disk" or diskette drive. More particularly, it relates to a door assembly that is simple in construction yet requires minimum clearance for its opening and closing operations and at the same time provides a pleasing, flush and uncluttered, facade when closed.

In a floppy disk drive a diskette, in a quasi-cartridge form, is inserted into the drive through an entrance slot. To assure proper operation, it must be physically retained in the slot. There are two general types of mechanisms that provide this function. The first is a bar which is swung between two positions, the first position being parallel to the slot to provide access, the second position being transverse to the slot to block egress therefrom.

The second retention device is a door which opens to provide access to and egress from the disk drive slot and shuts to retain a diskette within the slot. The invention is directed to improvements in the door type of retention mechanism. Specifically it is an object of the invention to provide a door assembly that requires minimal clearance within the enclosure that houses the disk drive and also provides a pleasing appearance in the form of a smooth uncluttered facade when the door is closed. A further object of the invention is to provide a door assembly characterized by ease of manipulation and, at the same time, low cost and reliable operation.

SUMMARY OF THE INVENTION

A door assembly incorporating the invention comprises a single door having a pair of guide pins extending from each end. These pins ride in, and are guided by, slots in stationary plates attached to the housing in which the assembly is disposed. At each end of the door, a first one of the slots is positioned adjacent to an edge of the door opening and is perpendicular to the front face of the housing. A second slot is angled from the first slot, extending forward and away from the first slot to a point at the door opening. A spring exerts a force on the guide pin in the second slot in a generally rearward direction and laterally toward the rearward end of the first slot.

When the door is closed, the guide pins are at the forward ends of the respective slots. The force of the spring, causes a lateral force component toward the wall of the first slot. Specifically, the pin in this slot is thus urged laterally against the wall of the slot. This latter force provides stability of the door in the closed position.

However, a small force against the edge of the door adjacent to the perpendicular slot moves that edge inwardly, pivoting the door around the second pin. This upsets the equilibrium condition and the spring tension causes both pins to move rearwardly. The slot geometry provides both rotation of the door, as well as rearward displacement. This causes the door to assume a wide open orientation, perpendicular to the front face of the housing, when the second pin reaches the rearward end of its slot, with both pins then being positioned in the perpendicular slot.

To close the door, one exerts a force on the opposite edge of the door, causing reverse travel to the closed position described above.

The door assembly is inexpensive, reliable and easily manipulated. At the same time it provides a closely fitting, flush closure, thereby contributing a pleasing appearance to the cabinet in which it is installed.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
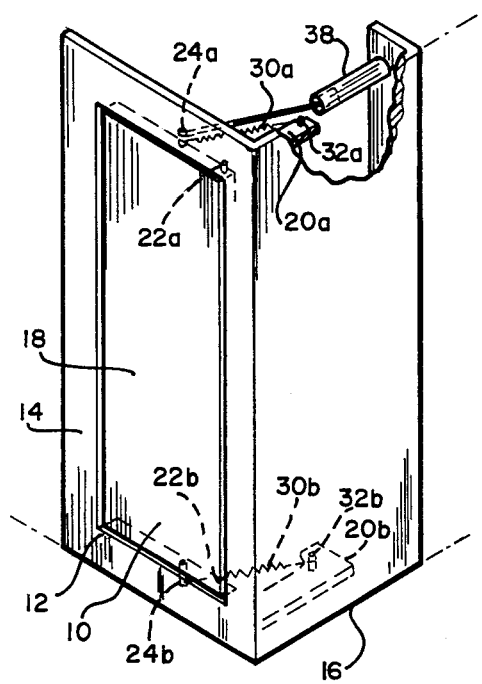
FIG. 1 is a perspective view from the front, showing a door assembly incorporating the invention, installed in a cabinet.
Figure 2:
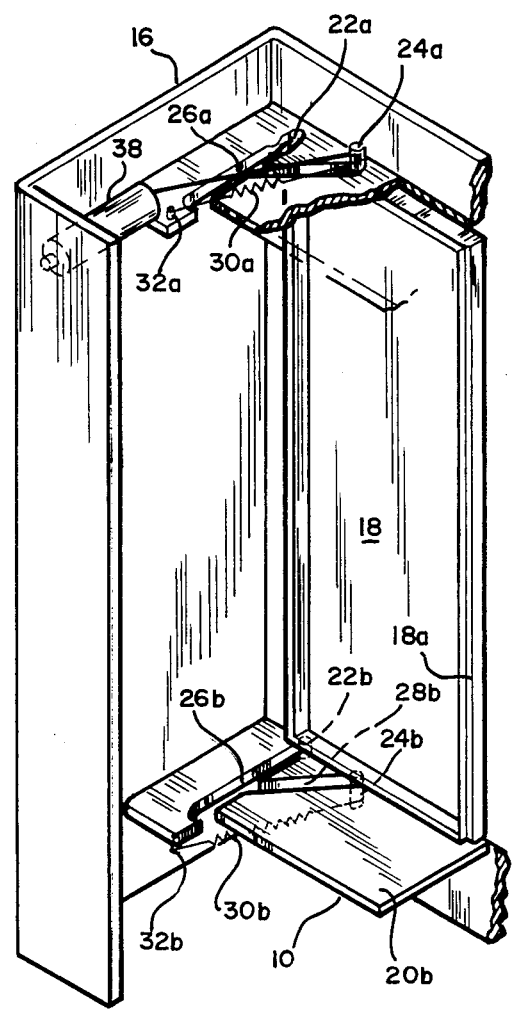
FIG. 2 is a perspective view from the rear of the assembly.
Figure 3:
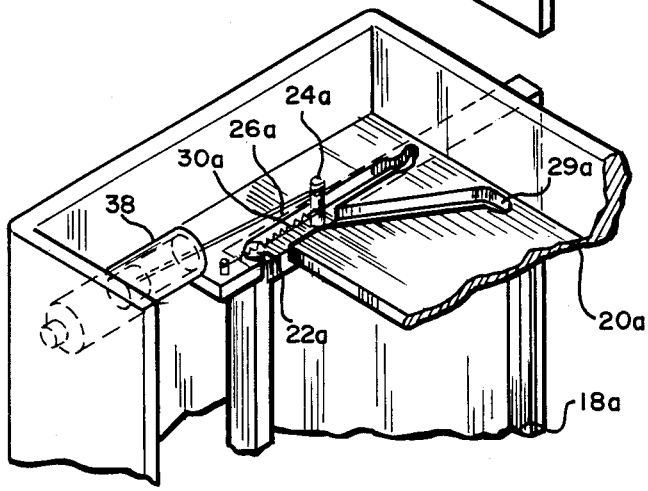
FIG. 3 is an enlarged fragmentary view of the guide components at the top of the door when the door is in the open position.

As shown in FIGS. 1-3, a door assembly generally indicated at 10 is used to close a door opening 12 in the front wall 14 of a cabinet fragmentarily shown at 16. The cabinet 16 houses various components of a data processing system and one of these components is a floppy disk drive that is mounted behind the door opening 12. The disk drive is omitted from FIGS. 1-3 in order to more clearly depict the various parts of the door assembly 10.

The assembly 10 comprises a door 18 mounted on upper and lower plates 20a and 20b affixed to the cabinet 16. Specifically, the door is mounted to the plates 20 by means of upper and lower pairs of guide pins 22a and 22b and 24a and 24b, affixed to the door. The pins 22a and 22b extend from the top and bottom of the door adjacent to its right hand edge 25 (FIGS. 1 and 5), while the pins 24a and 24b are disposed inwardly from the right hand edge. The plates 20a and 20b are provided with slots 26a and 26b that accomodate the pins 22, and slots 28a and 28b that accomodate the pins 24. The slots 26 are perpendicular to the front wall 14 of the cabinet and thus perpendicular to the door 10 when the door is in its closed position illustrated in FIGS. 1 and 2. The slots 28, on the other hand, are angled, extending from the slots 26 forwardly to the positions of the pins 24 in the closed position of the door 18. At their forward ends they connect with lateral extensions 29a and 29b (FIG. 3).

Still referring to FIGS. 1 and 2, a pair of springs 30a and 30b are fastened to the guide pins 24 at one end and at their other ends to posts 32a and 32b affixed to the plates 20a and 20b. The springs 30 thus urge the pins 24 rearwardly and to the left (FIG. 2) toward the slots 26.

Figure 4:
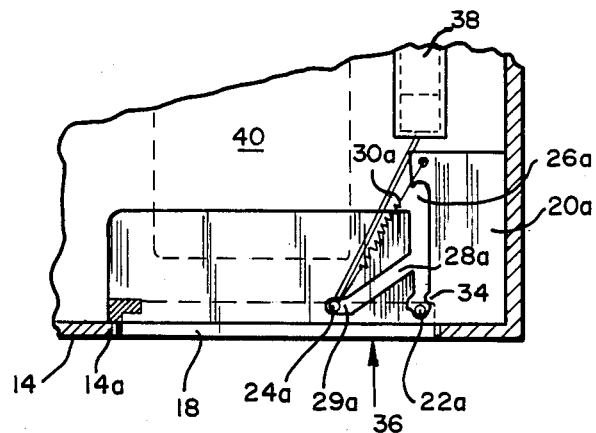
FIG. 4 is a top view of the door assembly when the door is closed.

With reference to FIG. 4, with the door 18 in the closed position and the pins 24 disposed in the lateral extensions 29 of the slots 28, only the lateral component of the force exerted by the springs 30 has an effect on the door 18. Specifically, this component forces the door to the right with the guide pins 22 thus being disposed forward of detent bulges 34 at the forward ends of the slots 26. This provides stability for the closed position of the door against the retraction forces exerted by the springs 30.

To open the door, one exerts an inward force against the door near its edge 25, as indicated by the arrow 36 in FIG. 4. This causes the door to pivot about the pins 24, with the pins 22 and edge 25 moving rearwardly. With the illustrated geometry, the tension of the springs 30 will cause a rearward force component to be exerted on the pins 22 so that the pins continue to move rearwardly.

Figure 5:
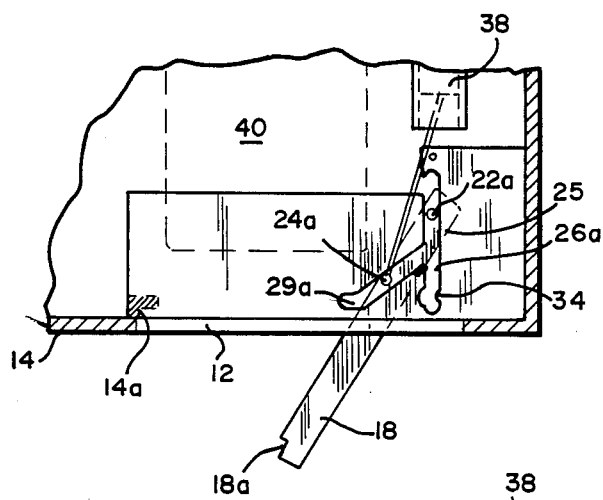
FIG. 5 is a top view of the door assembly when the door is partly open.

As shown in FIG. 5, as the pins 22 progress in the rearward direction, the pins 24 move rearwardly in the slots 28 so that the door 18 undertakes a rearward movement while at the same time swinging open. This movement continues until the door reaches the fully open and retracted position illustrated in FIG. 6. The door is now perpendicular to the front wall 14, with both the guide pins 22 and 24 in the slots 26.

Rearward movement of the door is terminated by a positive stop with the pins 24 adjacent to the rearward ends of the slots 28. The stop may take the form of engagement of the guide pins 22 with the rearward ends of the slots 26. Alternatively, the edge 25 of the door may abut a wall (not shown) which may be disposed within the cabinet 16 for aesthetic reasons also.

Figure 6:
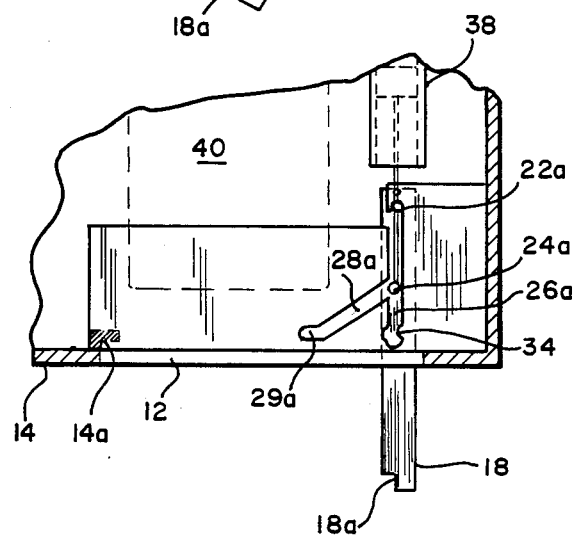
FIG. 6 is a top view of the door assembly when the door is fully open.

With the door fully open, one has ready access to an accessory, such as a floppy disk drive 40 shown in phantom in FIGS. 4–6. Moreover, it will be apparent that the door assembly requires minimal clearance within the cabinet 16, an important factor in the constant effort to reduce the physical sizes of data processing assemblies.

Preferably, the door assembly also includes a dash pot 38, linked to the guide pin 24a as illustrated, to control the velocity of the door when it swings open and moves rearwardly in response to the forces exerted by the spring 30.

With further reference to FIG. 6, to close the door 18 one initially exerts a leftward force on it. This moves the pins 24 into the slots 28 and the resulting camming action of the slots reverses the door motion described above in connection with opening the door. As the door swings around toward the closed position, the force exerted on it is, of course, directed rearwardly, so that when the pins 24 reach the lateral slot extensions 29, the final movement is a pivoting movement around the pins 24 to bring the pins 22 past the detent bulges 34.

The door is stopped at the end of the closure operation by engagement of a shoulder 18a in the door with an interfitting shoulder 14a in the front wall 14 of the cabinet 16.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A door assembly for closing a door opening in a wall of a cabinet or the like, said assembly comprising:
   A. a door having first and second ends and an edge extending between said ends;
   B. first and second guide pins extending from each of said ends,
      1. said first guide pins being disposed adjacent to said edge, and
      2. said second guide pins being spaced from said first guide pins in a direction away from said edge;
   C. first and second guide members fixed with respect to and oriented substantially perpendicular to said wall, said guide members being disposed adjacent to opposite ends of said door, each of said guide members including first and second intersecting slots in which first and second guide pins are respectively disposed,
      1. each of said first slots extending from a forward end to a rear end, said forward ends being disposed adjacent to said wall, said first slots being oriented substantially perpendicular to said door opening,
      2. each of said second slots having a forward end spaced laterally from the forward end of said first slots, said forward ends of said second slots being disposed adjacent to said wall, each of said second slots extending from its forward end to intersect with one of said first slots at an angle, each of said second slots being oriented such that it forms an acute angle with respect to said wall, whereby when the door is closed, the first guide pins are adjacent to the forward ends of the first slots and the second guide pins are adjacent to the forward ends of the second slots, and when the door is open, the first guide pins are disposed rearwardly from the intersections of said first and second slots and the second guide pins are disposed forwardly thereof; and
   D. a spring, said spring connected between one of said second guide pins and a retaining member, said retaining member disposed rearward of one of said second slots and being fixed with respect to one of said guide members, said spring being arranged to urge said door laterally and rearwardly into said door opening.

2. The assembly defined in claim 1 wherein at least one of said first slots includes a detent, said detent comprising a dislocation disposed adjacent to the forward end of said first slot.

3. The assembly defined in claim 1 wherein each of said first and second guide members includes a lateral slot, said lateral slot extending from an end to intersect the forward end of a second slot, said lateral slot oriented substantially parallel to said wall.

4. The assembly defined in claim 1 wherein a damping means is connected between one of said second guide pins and a retaining member, said retaining member fixed with respect to said wall, said damping means being arranged to retard the movement of said door.

5. The assembly defined in claim 1 wherein each of said first slots includes a stop member, said stop member being disposed whereby when the door is open, the first guide pins are engaged with the stop members and the second guide pins are located generally in the intersections of the first and second slots.

* * * * *